United States Patent
Kongable

(10) Patent No.: US 6,438,296 B1
(45) Date of Patent: Aug. 20, 2002

(54) FIBER OPTIC TAPER COUPLED POSITION SENSING MODULE

(75) Inventor: Albert W. Kongable, Orlando, FL (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/575,461

(22) Filed: May 22, 2000

(51) Int. Cl.[7] .................. G02B 6/26; G01C 3/08
(52) U.S. Cl. .............. 385/43; 356/4.01; 385/115; 385/121
(58) Field of Search ............... 385/15, 43, 88, 385/89, 115, 116, 120, 121; 356/3, 4.01, 4.03–4.08

(56) References Cited

U.S. PATENT DOCUMENTS

| | | | |
|---|---|---|---|
| 4,076,378 A | 2/1978 | Cole | 385/115 |
| 4,320,292 A * | 3/1982 | Oikawa et al. | 250/227.11 |
| 4,668,093 A | 5/1987 | Cahill | 356/477 |
| 5,313,542 A * | 5/1994 | Castonguay | 385/115 |
| 5,485,007 A | 1/1996 | Hollmann et al. | 250/227.28 |
| 5,519,801 A | 5/1996 | Le Noane et al. | 385/115 |
| 5,686,723 A | 11/1997 | Devenyi et al. | 250/227.11 |
| 5,799,126 A | 8/1998 | Nagatani et al. | 385/146 |
| 5,974,215 A * | 10/1999 | Bilbro et al. | 385/116 |
| 6,021,241 A * | 2/2000 | Bilbro et al. | 385/115 X |

* cited by examiner

*Primary Examiner*—John D. Lee
(74) *Attorney, Agent, or Firm*—Burns, Doane, Swecker & Mathis, LLP

(57) ABSTRACT

The present invention pertains to a low noise, high sensitivity position sensing module. Fiber optic tapers are coupled to independent, optically and electrically isolated single element detectors. The detectors are optionally supported within a mounting plate on one side thereof and the fiber optic tapers are coupled to the detectors on the opposite side of the mounting plate. Since single element detectors are used, the active surfaces of the detectors are shielded both optically and electrically from each other. A laser rangefinder can be integrated with the position sensing module.

20 Claims, 2 Drawing Sheets

FIBER OPTIC TAPER COUPLED POSITION SENSING MODULE

BACKGROUND OF THE INVENTION

1. Field of the Invention

The present invention generally relates to a detector module for measuring the angular position of an incoming signal and, in particular, to a position sensing module using fiber optic tapers and single element detectors.

2. State of the Art

Many systems designed to measure and/or track the angular position of an optical signal, for example a laser spot, make use of a quadrant cell detector. Quadrant cell detectors are generally known in the art and are normally monolithic chip structures with the sensitive elements created by doping selected areas of the chip and by leaving an area on the order of 100 μm wide undoped between the selected areas. Obtaining sufficient isolation between the channels in quadrant cell detectors for high sensitivity seekers and spot trackers often leads to very complex and expensive electronics designs. Moreover, currently available silicon quadrant cell detectors are relatively small, on the order of 1.5 mm in diameter, which presents a small active detecting area thereby limiting their usefulness for angular position sensing and spot tracking applications.

Another conventional way of determining the location of an incoming signal is through the use of detector arrays. Typical detector arrays include quadrant arrays and large area detectors that provide differential output, commonly known as Position Sensitive Detectors (PSD).

PSD's are normally monolithic PIN photodiodes with either one or two applied uniform resistive surfaces. When a light spot falls on the PSD, an electric charge is generated at the incident position and read out through the resistive surfaces. The photocurrent read out is inversely proportional to the distance between the incident position and the electrode, thus providing a means to measure the incident position. The effectiveness of conventional arrays of PIN photodiodes is limited due to the relative lack of sensitivity and long response time of the PIN sensors.

Thus, the usefulness of the above-described conventional detectors especially for optical angular position sensing applications, is often limited by the physical characteristics of the detectors, such as physical size, sensitivity, response time, and electrical and optical cross-talk and noise.

Accordingly, it is desirable to provide a position sensing module that overcomes the above-recited drawbacks and difficulties associated with conventional detectors.

SUMMARY OF THE INVENTION

It is an object of the present invention to use individual detectors that provide a high degree of both optical and electrical isolation between the detectors instead of a quadrant array or a large position sensitive detector, without requiring very complex and expensive electronics designs.

It is also an object of the present invention to easily and cost effectively integrate a high speed laser rangefinder detector and a high sensitivity laser spot tracker into a single module.

In accordance with the principles of the present invention, the position sensing module of the present invention overcomes the above-described limitations of conventional detectors, and others, by providing detector modules having lower cross-talk noise and higher sensitivity, while allowing for the incorporation of commercially available components and techniques.

According to the present invention, an incoming optical signal is transferred to one or more independent, electrically isolated detectors to provide the angular position measurement capability of a standard quadrant detector array or a position sensitive detector. The optical signal is received and transferred by fiber optic tapers. Fiber optic tapers are manufactured by precisely heating and stretching a fused bundle (or boule) of optical fibers. The resulting "hourglass-shaped" component is then cut and polished to provide the desired small/large surface area ratio. Fiber optic tapers will either magnify or minify an image, depending on the direction of propagation through the taper, with the amount of magnification determined by the ratio of surface areas.

The present invention includes a position sensing module comprising:
- a plurality of fiber optic tapers, each having a first surface, a tapered section and a second surface, said first surface having a larger surface area than said second surface;
- a plurality of position sensing detectors, each detector mounted to the second surface of a respective fiber optic taper.

The invention also includes a module for high speed laser rangefinding detection and high sensitivity laser spot tracking comprising:
- a plurality of fiber optic tapers, each having a first surface, a tapered section and a second surface, said first surface having a larger surface area than said second surface;
- a plurality of position sensing detectors, each detector mounted to the second surface of a respective fiber optic taper; and
- a rangefinding detector coupled to an optical fiber.

BRIEF DESCRIPTION OF THE DRAWING FIGURES

Other objects and advantages of the present invention will become more apparent to those skilled in the art from reading the following detailed description of preferred embodiments in conjunction with the accompanying drawings, wherein like elements have been designated with like reference numerals, and wherein.

DETAILED DESCRIPTION OF THE PREFERRED EMBODIMENTS

Figure 1:
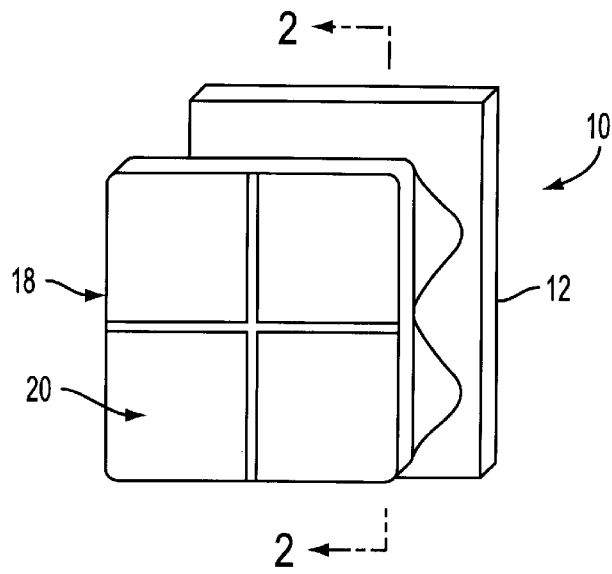
FIG. 1 is a perspective view of the position sensing module according to an exemplary embodiment of the present invention.

FIG. 1 illustrates an exemplary position sensing module 10 constructed according to the principles of the present invention. Four fiber optic tapers 20 are tiled together to form a square 2×2 array. It is to be understood, however, that the present invention contemplates larger arrays having a larger number of fiber optic tapers 20 and tracking detectors 16.

The large ends of the tapers form the quadrants of the position sensing module 10 with the smaller ends being bonded to individual detector elements. The position sensing module 10 includes a mounting plate 12 and a fiber optic taper array 18 having four fiber optic tapers 20 arranged to form a square quadrant pattern.

Figure 2:
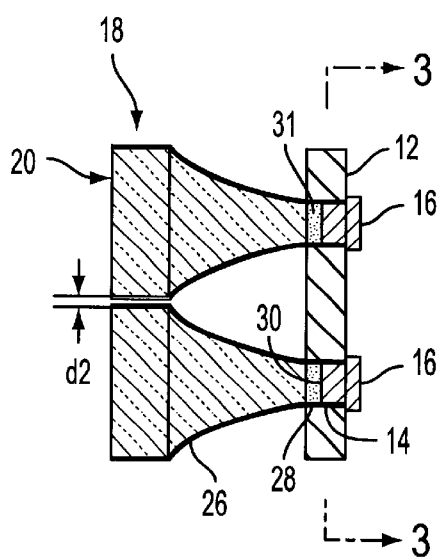
FIG. 2 is a cross-sectional side view taken along line 2—2 of the FIG. 1.
Figure 3:
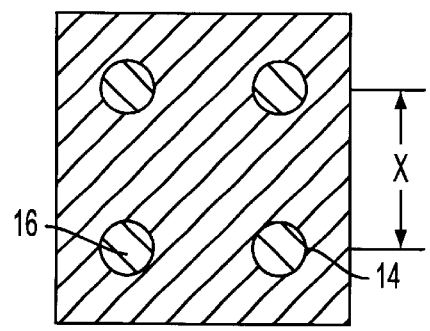
FIG. 3 is a cross-sectional view taken along line 3—3 of FIG. 2.
Figure 4:
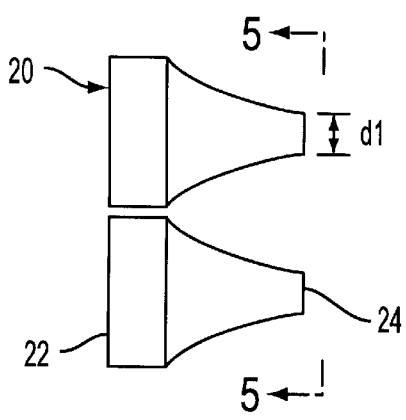
FIG. 4 is a side view of the fiber optic taper array of the position sensing module.
Figure 5:
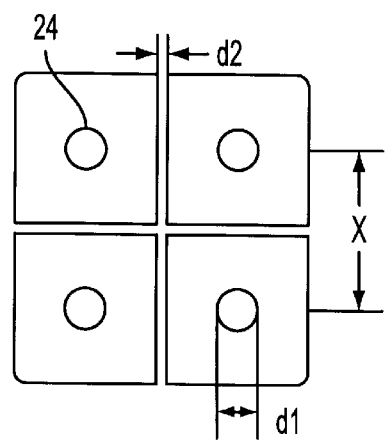
FIG. 5 is a plan view taken along line 5—5 of FIG. 4.

Referring to FIG. 2, the mounting plate 12 comprises a body with a plurality of apertures 14 extending therethrough. The mounting plate 12 may be formed from any suitable material that provides sufficient structural support. The mounting plate 12 could thus be formed from plastic, a metal such as aluminum, ceramic, or the like, depending on the particular design requirements of the intended application.

Each tracking detector 16 is mounted within a respective aperture with its detecting surfaces 30 being housed therein. The tracking detectors 16 have one end with a smaller diameter d1. Each tracking detector 16 is positioned a substantial distance x from the other tracking detectors 16. The tracking detectors 16 can thus be electrically isolated to eliminate noise since they are separated by a distance x.

The fiber optic tapers 20 of the fiber optic taper array 18 are coupled to the small ends having a diameter d1 of a respective tracking detector 16 by any suitable technique, such as potting with a clear adhesive 31.

The fiber optic tapers 20 of the fiber optic taper array 18 have a first side 22 and second side 24. In preferred embodiments, the first side 22 is square or rectangular and the second side 24 is round. The round side 24 having a diameter d1. The first side 22 covers a greater area than the second side 24. The fiber optic tapers 20 may include an optically opaque material 26 around the outer periphery thereof in order to eliminate optical crosstalk between the fiber optic tapers 20.

Advantageously, fiber optic tapers 20 of the type used in the present invention can include commercially available fiber optic tapers. Such fiber optic tapers are commercially available from Schott Fiber Optics.

FIGS. 6–10 illustrate another exemplary embodiment of the present invention. In this embodiment, a high speed laser rangefinding detector, having a diameter d, is incorporated into the position sensing module. Otherwise, the arrangement is generally the same as the module previously described. Thus, the same reference numerals have been used to describe those elements which correspond to the previously described embodiment.

Figure 6:
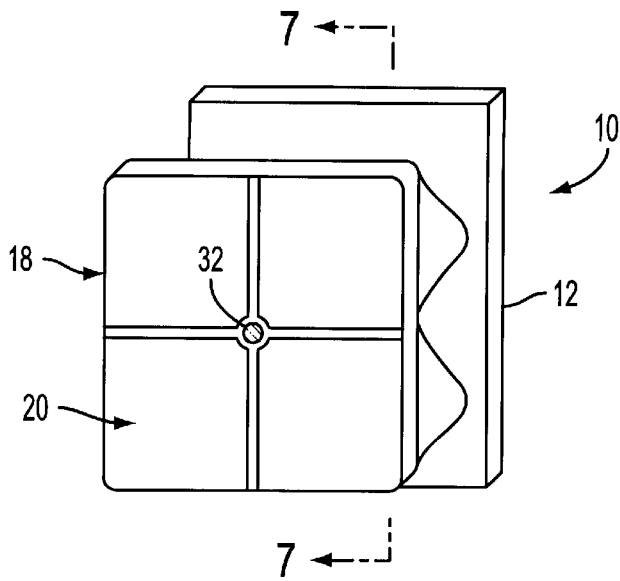
FIG. 6 is a perspective view of the position sensing module according to a second embodiment of the present invention.
Figure 7:
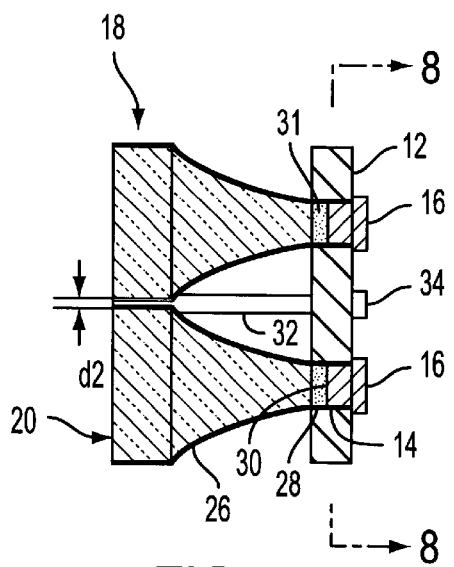
FIG. 7 is a cross-sectional side view taken along line 7—7 of FIG. 6.
Figure 8:
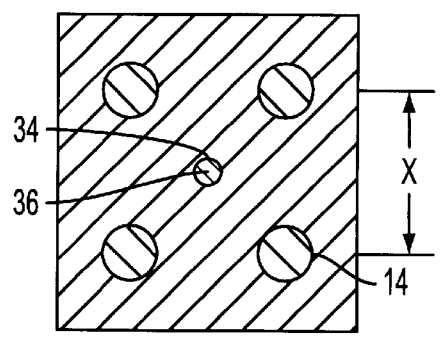
FIG. 8 is a cross-sectional view taken along line 8—8 of FIG. 7.

As shown, for example, in FIG. 6, the fiber optic tapers 20 have roughly the same configuration as those of the first embodiment. The corners of the first side 22 of the fiber optic tapers 20 located near the center of the fiber optic taper array 18 can be formed with a quarter circle arc, such that an optical fiber 32 of the rangefinding detector is accommodated therein, and an end surface 38 of the optical fiber 32 is exposed. While the rangefinder has been illustrated as being located in the center of the array, it is possible to locate the rangefinder in other areas. Moreover, it is possible to separate the rangefinder device from the array by, for example, mounting it to a separate mounting plate (not shown).

Figure 9:
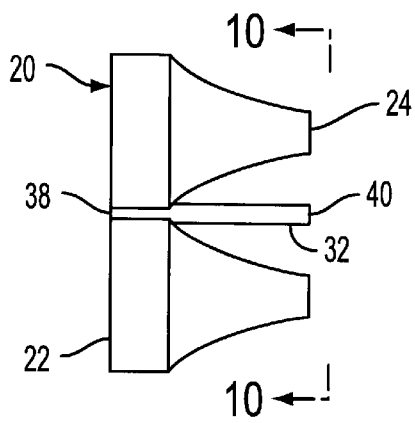
FIG. 9 is a side view of the fiber optic taper array according to the embodiment shown in FIG. 7.
Figure 10:
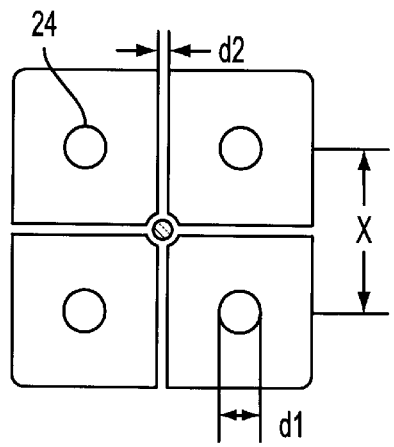
FIG. 10 is a plan view taken along line 10—10 of FIG. 9.

The optical fiber 32 is coupled to the detecting surface 36 of the rangefinding detector 34. The detecting surface 36 of the rangefinding detector 34 is the surface upon which light is detected by the rangefinding detector 34. As can be seen in FIG. 9, the optical fiber 32 has a first end 38 and a second end 40. As illustrated FIG. 7, the second end 40 is coupled to the detecting surface 36 of the rangefinding detector 34. The second end 40 may be bonded to the detecting surface 36 by any suitable means, such as with clear adhesive. The optical fiber 32 may include an optically opaque material (not shown) around its outer shell in order to eliminate optical crosstalk with the fiber optic tapers 20.

The tracking detectors 16, may comprise any suitable detection device. Preferably, however, the tracking detectors 16, are either high sensitivity Avalanche PhotoDiodes (APDs) or high speed PIN diodes.

In operation, the present invention could be used for measuring and/or tracking the angular position of an optical signal in either of two ways. The first and simplest way is in a "bang-bang" mode, where the diameter of the optical spot or signal formed on the square surface is smaller than the cladding separation d2 between the fiber optic tapers. In this mode, the optical signal is never present in more than one of the detector elements and tracking is accomplished by driving the signal to oscillate around the center of the array. Since no comparative power measurements are made, the individual detector elements do not have to be particularly well balanced in gain or sensitivity.

The second method of operation is as a "proportional" tracker, where the diameter of the optical spot or signal formed on the square surface is much larger than the cladding separation distance d2 between the fiber optic tapers. In this mode, the optical spot can exist in more than one detector path at one time, and comparative measurements of the power falling in each detector is used to calculate a centroid for the spot. This method, because of the comparative measurements, requires more sophisticated algorithms and balancing of the gain and sensitivity of the individual detectors.

The field of view of the position sensing module 10 will be determined by the magnification of the fiber optic tapers 20. Fiber optic tapers 20 are designed to have a Numerical Aperture (NA) of 1 at the small end, which is equivalent to a 90 degree field of view (NA=Sin($\alpha$), where $\alpha$ is the acceptance angle or field of view of the fiber). The effective NA at the input (first side 22) of the taper is simply the NA of the small end (second side 24) divided by the magnification of the taper ($NA_{eff}$=NA*d1/x). Standard commercial fiber optic tapers have magnifications ranging up to 5:1 (18 degree field of view), but custom tapers have been produced with 10:1 magnifications (9 degree field of view). The fiber optic taper field of view could be further modified by adding magnification and field stops in the optical system that precedes the position sensing module 10 and the high speed laser rangefinding detector assembly 10.

Table 1 contains comparative characteristics for several possible detector types contemplated by the present invention. The data includes InGaAs PIN photodiodes, InGaAs PIN Quad cells (InGaAs detectors are used for detecting 1.06 and 1.5 micron wavelength lasers), Silicon APD, Silicon APD Quad Cell, Silicon PIN Quad Cell, and Silicon PSDs (Silicon detectors are used to detect visible, near IR diode, and 1.06 micron lasers).

TABLE 1

Representative Detector Characteristics

| Characteristic (units) | Fiber Optic Taper Position Sensing Module Detector Options | | Quadrant Cell Detector Options | | | Position Sensitive Detector |
|---|---|---|---|---|---|---|
| | InGaAs PIN | Si APD | InGaAs PIN Quad Cell | Si APD Quad Cell | Si PIN Quad Cell | Silicon PIN |
| Active Area Diameter (mm) | 1[1] | 1.5[2] | 7 | 1.5 | 8 | 2 |
| Responsivity (A/W) | | | | | | |
| • at 900 nm λ | 0.2 | 70 | | 62 | 0.6 | 0.6 |
| • at 1.06 nm λ | ~0.55 | | 0.82 | | | |
| • at 1.5 mm λ | 0.95 | | 1.03 | | | |
| Dark Current (nA) | 20 | 100 | 2000 | 25 | 200 | 1 |
| Response Time (nS) | >7 | 2 | 82 | 3 | 6 | 500 |
| NEP (pW/√Hz) | | | | | | |
| • at 900 nm λ | | 0.008 | | 0.008 | 0.43 | — |
| • at 1.06 nm λ | >0.9 | | 2 | | | |
| • at 1.5 nm λ | ~0.9 | | 1.6 | | | |

[1]InGaAs PIN active area diameter chosen so that four detectors, expanded through a 3:1 fiber optic taper, would provide an effective area of 6 mm, approximately the same as the INGaAs PIN quad cell.
[2]Silicon APD active area diameter chosen so that two detectors, expanded through a 3:1 fiber optic taper, would provide an effective area of 9 mm, approximately the same as the Si PIN quad cell.

As seen in Table 1, the use of single element PIN photodiodes or APDs as detectors significantly improves response time, dark current, and Noise Equivalent Power. Thus, since the present invention permits use of the single element PIN photodiodes and APDs as detectors, the present invention benefits from the characteristics of these detectors.

Note that, while APD quad cells can give performance characteristics similar to those obtainable with the present invention, InGaAs APD quad cells are not currently available and Silicon APD quad cells, while available commercially, are limited to very small detector active area diameters. The largest Silicon APD quad cells available are only on the order of 1.5 mm in diameter. The small detector size limits their usefulness for angular position measuring and spot tracking applications.

One of the advantages of the fiber optic taper coupled position sensing module of the present invention over known quadrant cell detectors, in general, is its ability to effectively and efficiently implement optical and electrical isolation between the channels. Thus, the present invention permits a high sensitivity, low noise/crosstalk detector module that is capable of measuring the angular position of an incoming signal just as a standard quadrant cell detector does, without being susceptible of some drawbacks and disadvantages associated with other known position sensing detectors.

Potential commercial applications of the present invention include laser spot trackers, boresight modules, laser guided missile seekers, and robotic vision.

Although the present invention has been described by reference to particular embodiments, it is in no way limited thereby. To the contrary, modifications and variants should be apparent to those skilled in the art in the context of the following claims.

What is claimed is:

1. A position sensing module comprising:
    a plurality of fiber optic tapers defining a sensing quadrant, each having a first surface, a tapered section and a second surface, said first surface having a larger surface area than said second surface;
    a plurality of position sensing detectors, each detector mounted to the second surface of a respective fiber optic taper; and
    a rangefinding detector,
    wherein all of the first surfaces of the fiber optic tapers present in the module lie within a single plane thereby defining the sensing quadrant of the module.

2. The position sensing module of claim 1, further comprising a mounting plate, wherein the plurality of detectors are embedded in the mounting plate.

3. The position sensing module of claim 2, wherein said mounting plate comprises openings therethrough and wherein said detectors are embedded within said openings.

4. The position sensing module of claim 3, wherein said second surfaces of the fiber optic tapers are bonded to said detectors within said openings of said mounting plate.

5. The position sensing module of claim 1, wherein said fiber optic tapers are square-to-round fiber optic tapers.

6. The position sensing module of claim 1, wherein said fiber optic tapers are coupled to said detectors with clear adhesive.

7. The position sensing module of claim 1, wherein said detectors comprise at least one of high sensitivity Avalanche Photodiodes and high speed PIN diodes.

8. The position sensing module of claim 1, wherein each of said fiber optic tapers has an optically opaque material around at least a portion of the tapered section.

9. A position sensing module comprising:
    a square array of fiber optic tapers defining a sensing quadrant, each fiber optic taper having a first surface, a tapered section and a second surface, said first surface having a larger surface area than said second surface; and
    a plurality of position sensing detectors, each detector mounted to the second surface of a respective fiber optic taper, wherein all of the first surfaces of the fiber optic tapers present in the module lie within a single plane thereby defining the sensing quadrant of the module.

10. A module for high speed laser rangefinding detection and high sensitivity laser spot tracking comprising:

a plurality of fiber optic tapers defining a sensing quadrant, each having a first surface, a tapered section and a second surface, said first surface having a larger surface area than said second surface;

a plurality of position sensing detectors, each detector mounted to the second surface of a respective fiber optic taper; and a rangefinding detector coupled to an optical fiber.

11. The module of claim 10, further comprising a mounting plate, wherein the plurality of detectors and the rangefinding detector are embedded in the mounting plate.

12. The module of claim 11, wherein the rangefinding detector is mounted in the center of the plurality of fiber optic tapers.

13. The module of claim 10, wherein said fiber optic tapers are square-to-round fiber optic tapers.

14. The module of claim 10, wherein said detectors comprise at least one of high sensitivity Avalanche Photodiodes and high speed PIN diodes.

15. The module of claim 10, wherein each of said fiber optic tapers has an optically opaque material around at least a portion of the tapered section.

16. The module of claim 10, further comprising four fiber optic tapers positioned in a square quadrant formation.

17. The module of claim 10, wherein the module is constructed to sense the angular position of an optical signal present in only one of the detectors of the module.

18. The module of claim 10, wherein the sensing quadrant comprises a square array of fiber optic tapers.

19. The module of claim 10, wherein all of the first surfaces of the fiber optic tapers present in the module lie within a single plane thereby defining the sensing quadrant of the module.

20. A position sensing module comprising:

a plurality of fiber optic tapers defining a sensing quadrant, each having a first surface, a tapered section and a second surface, said first surface having a larger surface area than said second surface; and a plurality of position sensing detectors, each detector mounted to the second surface of a respective fiber optic taper, wherein all of the first surfaces of the fiber optic tapers present in the module lie within a single plane thereby defining the sensing quadrant of the module, and the module is constructed to sense the angular position of an optical signal present in only one of the detectors of the module.

* * * * *